United States Patent
Chen et al.

(10) Patent No.: US 8,457,460 B2
(45) Date of Patent: Jun. 4, 2013

(54) SINGLE FIBER MACH-ZEHNDER FILTER AND METHOD OF MANUFACTURING THE SAME

(75) Inventors: Nan-Kuang Chen, Miaoli (TW); Zhi-Zheng Feng, Miaoli (TW)

(73) Assignee: National United University, Miaoli (TW)

( * ) Notice: Subject to any disclaimer, the term of this patent is extended or adjusted under 35 U.S.C. 154(b) by 253 days.

(21) Appl. No.: 12/963,142

(22) Filed: Dec. 8, 2010

(65) Prior Publication Data
US 2011/0305418 A1    Dec. 15, 2011

(30) Foreign Application Priority Data
Jun. 11, 2010    (TW) .................................. 99119193 A

(51) Int. Cl.
*G02B 6/26*    (2006.01)
*G02B 6/42*    (2006.01)

(52) U.S. Cl.
USPC ............................................. 385/43; 385/39

(58) Field of Classification Search
USPC .......................................................... 385/43
See application file for complete search history.

(56) References Cited

U.S. PATENT DOCUMENTS

| | | | | | |
|---|---|---|---|---|---|
| 4,946,250 | A | * | 8/1990 | Gonthier et al. | 385/27 |
| 5,664,037 | A | * | 9/1997 | Weidman | 385/46 |
| 5,708,740 | A | * | 1/1998 | Cullen | 385/39 |
| 5,943,458 | A | * | 8/1999 | Miller | 385/39 |
| 6,832,030 | B2 | * | 12/2004 | Gonthier | 385/43 |
| 6,836,606 | B2 | * | 12/2004 | Abeeluck et al. | 385/125 |
| 6,862,386 | B2 | * | 3/2005 | Corio et al. | 385/43 |
| 2002/0157422 | A1 | * | 10/2002 | Corio et al. | 65/385 |
| 2003/0180001 | A1 | * | 9/2003 | Gonthier | 385/43 |
| 2004/0136670 | A1 | * | 7/2004 | Abeeluck et al. | 385/125 |
| 2011/0305418 | A1 | * | 12/2011 | Chen et al. | 385/43 |

* cited by examiner

*Primary Examiner* — Rhonda Peace
(74) *Attorney, Agent, or Firm* — Volpe and Koenig, P.C.

(57) ABSTRACT

The present invention provides a method for producing a Mach-Zehnder filtering device. The method includes the following steps: (a) providing an optical fiber having a jacket and a core containing rare earth element dopants; (b) stripping the jacket of a segment of the optical fiber; and (c) performing a fused-tapering to the stripped segment of the optical fiber to form a first and a second necks simultaneously, wherein the core exists in both the first and the second necks to form a Mach-Zehnder interferometer.

16 Claims, 4 Drawing Sheets

SINGLE FIBER MACH-ZEHNDER FILTER AND METHOD OF MANUFACTURING THE SAME

FIELD OF THE INVENTION

The present invention relates to a Mach-Zehnder filtering device, particularly a single-fiber Mach-Zehnder filtering device and the method of producing the Mach-Zehnder filtering device.

BACKGROUND OF THE INVENTION

Mach-Zehnder interferometers (MZI) are important components for fiber-optic narrow-band wavelength (de)multiplexing as well as precision sensing. The fundamental concept of the MZI is to split a coherent light, such as a laser, into two different paths. Due to different refraction indices of the two paths, lights processing in the two paths will end up with different phase change or phase displacement. When the lights in the two paths eventually meet together, there occurs the so-called Mach-Zehnder interference.

Please refer to FIG. 1, which is a schematic diagram showing the structure as well as the function of a MZI according to the prior art. The MZI 10 includes an entry 11, a light-splitting portion 12, a first path 13, a second path 14, and a light-coupling portion 15. A single-mode laser in enters the entry 11, and is equally (about 50% each) split into the first and second paths 13, 14. The one enters the first path 13 is denoted as Laser 1, and the one enters the second path 14 is denoted as Laser 2. Since the refraction index of the first path 13 is significantly different from that of the second path 14, the effect due to phase delay to Laser 1 and Laser 2 shall be different. When Laser 1 and Laser 2 meet at the light-coupling portion 15, interference occurs due to the phase difference thereinbetween. Theoretically, the effect of interference that ends up with high extinction ratio is produced if the phase difference between two lights interfering each other is an odd-number time to the mathematical constant pi. Therefore, if the phase difference between the lights proceeding in the two paths 13 and 14 can be effectively controlled, it can be used for controlling or adjusting laser lights, say filtering for example.

According to the prior art set for above, two light paths of a current MZI are disposed at separated locations. To produce sufficient phase difference between the lights in each light path, both the two light paths should have sufficient length in order to provide propagation lengths for the lights. Besides, there are cost related concerns regarding the manufacturing for the light-splitting portion 12 and the light-coupling portion 15. Therefore, if the two light paths can be significantly shortened so the dimension of the MZI can be reduced on one hand, and a more cost-effective method for manufacturing the light-splitting portion and the light-coupling portion is developed on the other hand, breakthroughs can be obtained at two important aspect, which are cost and miniturization, and advantages in terms of application and commercialization are so achieved.

The present invention uses a single optical fiber for manufacturing a MZI apparatus. The novel structure design for the MZI needs only some simply steps to make the light-splitting portion, the light-coupling portion, and the two light paths of appropriate length simultaneously. Compared with the prior art design, the MZI according to present invention has breakthroughs not only in the aspect of cost but also miniturization. Besides, the present invention makes use of the core and cladding of the optical fiber for being the two light paths. Since the disturbing conditions from the environment that the core and the cladding of the optical fiber exist are the same, the stability of the MZI provided by the present invention is less affected by its operation environment.

SUMMARY OF THE INVENTION

To achieve the abovementioned advantages, the present invention provides a method for producing a Mach-Zehnder filtering device. The method includes the following steps: (a) providing an optical fiber having a jacket and a core containing rare earth element dopants; (b) stripping the jacket of a segment of the optical fiber; and (c) performing a fused-tapering to the stripped segment of the optical fiber to form a first and a second necks simultaneously, wherein the core exists in both the first and the second necks to form a Mach-Zehnder interferometer. Preferably, the first neck transfers a portion of a core-mode energy of a light proceeding in the core into an energy of cladding modes thereof, and the second neck transfers the energy of the cladding modes of the light back into the core-mode energy thereof to from an interference.

Preferably, the step (c) is performed by placing the stripped segment of the optical fiber across a flame to fuse and taper the striped segment of the optical fiber by a high temperature at brims of the flame.

Preferably, the fused-tapering is performed by heating the stripped section of the optical fiber by a laser.

Preferably, the optical fiber is doped with at least a rare earth element including one selected from a group consisting of an erbium, a ytterbium, a samarium, a praseodymium and a thulium.

Preferably, the core comprises a base material including one selected from a group consisting of a phosphosilicate, a phosphate, a tellurite and a silicate.

Preferably, each of the optical fiber and the first and the second necks thereof has a polarization-maintaining structure.

In accordance with another aspect of the present invention, a wavelength-adjustable Mach-Zehnder filtering device is provided. The device includes an optical fiber doped with a rare-earth element having a core, a first and a second necks, and the core exists in the first and the second necks. Preferably, the first neck transfers a portion of a core-mode energy of a light proceeding in the core into an energy of cladding modes thereof, and the second neck transfers the energy of the cladding modes of the light back into the core-mode energy thereof to from an interference Preferably, the stripped section of the optical fiber is placed across a flame, and a fused-tapering process is performed by a high temperature at brims of the flame.

Preferably, the fused-tapering is performed by heating the stripped section of the optical fiber by a laser.

Preferably, the optical fiber is doped with at least a rare earth element including one selected from a group consisting of an erbium, a ytterbium, a samarium, a praseodymium and a thulium.

Preferably, the core comprises a base material including one selected from a group consisting of a phosphosilicate, a phosphate, a tellurite and a silicate.

Preferably, each of the optical fiber and the first and the second necks thereof has a polarization-maintaining structure.

Preferably, the core of the optical fiber has a variety of conditions of a photon population inversion pumped by an external pumping light.

Preferably, the external pumping light has a wavelength at a strong-absorption and strong-emission wavelength region of the optical fiber.

In accordance with a further aspect of the present invention, a Mach-Zehnder filtering device is provided. The Mach-Zehnder filtering device includes an optical fiber having a first and a second necks and a segment between the first and the second necks, wherein the segment provides at least two light paths of different phase delays to generate a Mach-Zehnder interference. Preferably, the optical fiber is doped with at least a rare earth element including one selected from a group consisting of an erbium, a ytterbium, and a thulium, and the segment has a distance determined based on a predetermined effect of the apparatus.

The above objects and advantages of the present invention will be more readily apparent to those ordinarily skilled in the art after reading the details set forth in the descriptions and drawings that follow, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 2:
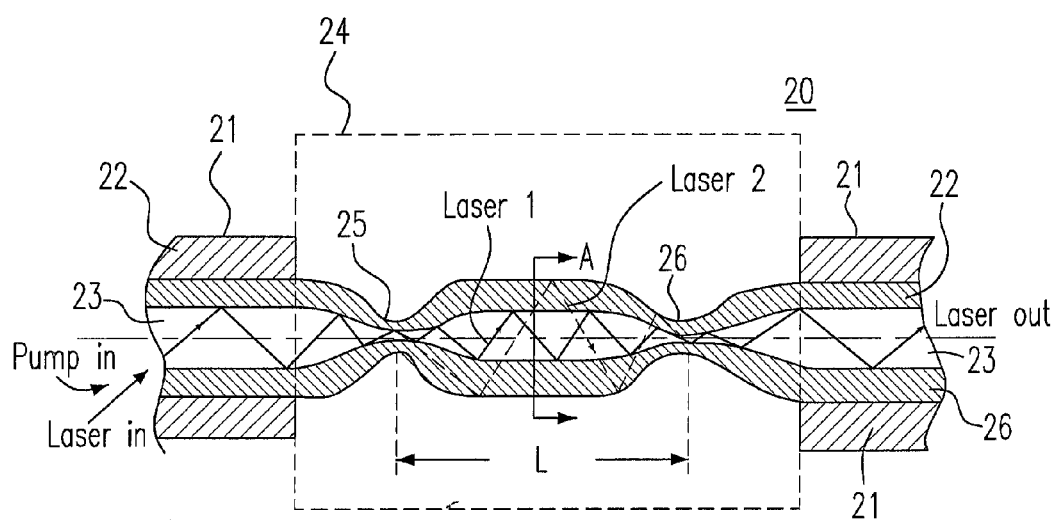
FIG. 2 is a schematic diagram showing a MZI apparatus made with a single optical fiber in accordance with a preferred embodiment of the present invention.

Please refer to FIG. 2, which is a schematic diagram showing a MZI apparatus made with a single optical fiber in accordance with a preferred embodiment of the present invention. According to FIG. 2, the apparatus 20 has fundamental elements of an optical fiber including a jacket 21, a cladding 22 and a core 23. To make a certain difference in diffraction indices of the cladding 22 and the core 23, an applicable embodiment is to use materials doped with rare earth elements, such as erbium, ytterbium, a samarium, a praseodymium and a thulium, for the cladding 22 or the core 23. Usually the doped material has a higher diffraction index. Preferably, the core 23 has a base material of phosphosilicate, phosphate, tellurite or a silicate. The rare earth elements can also be used as optical gain material. The mentioned doped optical fibers are available in the market, and can be obtained with reasonable cost. One preferred embodiment for the optical fiber having doped core is DY1500Y having an erbium-ytterbium co-doped core. The ions of rare earth elements doped in the optical fiber material are not easy to be diffused under an environment in a low temperature flame (around 700 degrees C.), which is advantageous for the subsequent manufacturing process.

From the apparatus 20 illustrated in FIG. 2, the skilled person in the art can realize that, a portion of the jacket 21 originally encompassing the cladding 22 and the core 23 has been stripped, and a stripped segment 24 is exposed to the air. In one preferred embodiment, most of the material of the cladding 22 in the stripped portion of the jacket 21 is further etched with an acid, and there remains a thin layer of the cladding 22 covering the core 23. Such an embodiment renders the finished apparatus 20 more compact. The cladding 22 and the core 23 in the stripped segment 24 is further manufactured to form a first neck 25 and a second neck 26 having a first external diameter (not shown) and a second external diameter (not shown) respectively. The distance between the first and second necks 25, 26 is denoted as L. A laser in (usually a single-mode laser) proceeding from left to right in the core 23 enters the first neck 25. Due to the abrupt change of the diameter of the core 23 near the first neck 25, the incident angle of the laser in to the interface of the cladding 22 and the core 23 changes significantly, and thus a portion of the laser in may be split into the cladding 22. (as illustrated with dotted line) The laser light remaining in the core 23 is denoted as Laser 1 while the laser light proceeding in the cladding 22 is denoted as Laser 2. The type of mode of Laser 1 proceeding in the core 23 is called a core mode, and the type of mode of Laser 2 in the cladding is called a cladding mode.

Figure 1:
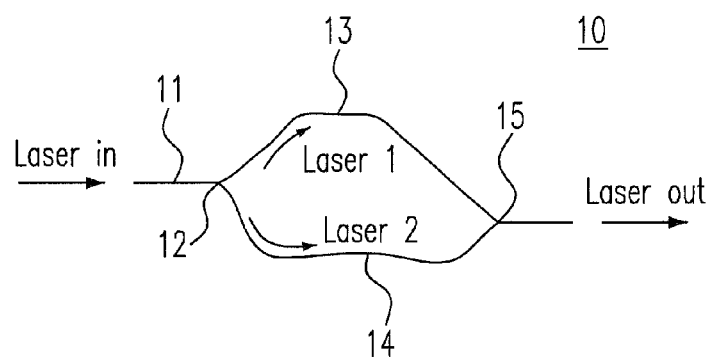
FIG. 1 is a schematic diagram showing the structure of a MZI according to the prior art.
Figure 3:
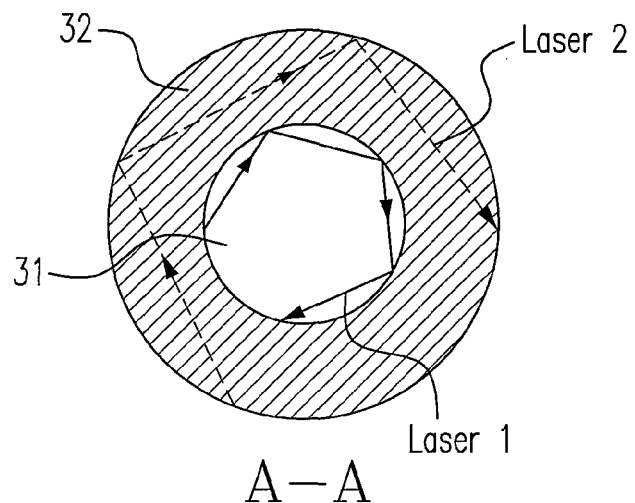
FIG. 3 shows a cross-section diagram of the center portion A of the stripped segment in FIG. 2.

Please refer to FIG. 3, which schematics a cross-section diagram of the center portion A of the stripped segment 24. It can be observed that the Laser 1 proceeds in the core 23 and the Laser 2 does in the cladding 22. Since the refraction index of the cladding 22 is higher than that of the air, the Laser 2 is fully reflected back into the cladding 22 when hitting the interface between the cladding 22 and the air. According to FIG. 3, it can be realized that the Laser 1 and Laser 2 are actually proceeding in two different light path, namely the first path 31 and the second path 32, which serves the same functions as that of the two light paths 13 and 14 of the MZI illustrated in FIG. 1.

One may have the core 23 of the optical fiber be pumped with an external pumping light, Pump in, to obtain a variety of conditions of a photon population inversion. Preferably, the external pumping light has a wavelength at a strong-absorption and strong-emission wavelength region of the optical fiber.

When the Laser 2 proceeding in the second path 32 eventually meets the second neck 26, the Laser 2 may return back to the core 23 due to the abrupt change of the diameter of the cladding 22 near the second neck 26 and the incident angle of the Laser 2 to the interface of the cladding 22 and the core 23 changes significantly. After entering the core 23, the Laser 2 meets the Laser 1 so occurs interference, which is also Mach-Zehnder interference. For laser lights of different wavelengths, the MZI apparatus 20 as shown in FIG. 2 can cause interference effects of different severity. Therefore the apparatus 20 can be utilized as a filter.

Notably, although the outer dimension of the neck structure of the optical fiber as illustrated in FIG. 2 is significantly smaller to other portion thereof, the core 23 still exists in the neck. Both the cladding 22 and the core 23 are tapered simultaneously during the process for forming the necks 25, 26. Therefore, a portion of the incident laser in remains in the light path 31 provided by the core 23. Both the first and the second necks 25, 26 thereof have a polarization-maintaining structure.

Due to the refraction index of material of an optical fiber doped with rare earth elements are significantly different from that of material of an optical fiber without doping, the difference of phase delays between the Laser 1 proceeding in the first path 31 and the Laser 2 in the second path 32 may achieve an odd number times of pi after the Laser 1 and the Laser 2 having proceeding in the paths 1, 2 for a certain distance which is not very long, and such a difference causes an interference resulting in a high extinction ratio. Table 1 shows results of the experiments using a variety of dimensions of single-fiber MZI apparatus with erbium-ytterbium co-doped optical fiber according to the present invention.

TABLE 1

Experiment results using an erbium-ytterbium co-doped optical fiber to make MZI under different conditions, in which $D_1$ denotes the outer diameter of the first neck, $D_2$ the outer diameter of the second neck, D the difference between $D_1$ and $D_2$, Section length of the tripped section of the optical fiber, Extinction Ratio1 the best result obtained when the striped section exposed to the air, and Extinction Ratio1 the best result obtained when the striped section in a liquid (refraction index = 1.456).

| D (µm) | $D_1$ (µm) | L (mm) | $D_2$ (µm) | Section (mm) | Extinction Ratio$_1$ (dB) | Extinction Ratio$_2$ (dB) |
|---|---|---|---|---|---|---|
| 3 | 46 | 5.30 | 49 | 13 | 31 | 18.2 |
| 6 | 43 | 5.21 | 49 | 13.5 | 11.2 | 20.8 |
| 26 | 39 | 5.18 | 65 | 17.5 | 10.9 | 11.6 |
| 3.6 | 57.4 | 6.32 | 61 | 28 | 18 | 15 |
| 3.8 | 49.7 | 29 | 53.5 | 32 | 19.5 | 10.7 |
| 4.6 | 57.4 | 27 | 62 | 34 | 20.1 | 9.3 |

According to the experiment results, the effect of interference made by the MZI apparatus provided by the present invention is significant when the first and the second diameters are around 40 to 60 micrometers. In theory, if the change in dimension is too large (says the outer diameters of the necks are less than 40 micrometer), the first neck 25 acting as the light splitter transfers most of the laser energy into the second path 32 to form a Laser 2 having a high level cladding mode and results in serious energy loss. On the contrary, if the outer diameters are larger than 60 micrometers, the effect of light splitting is not good, and the amount of laser entering into the second path 32 is so small that the expected interference cannot occur afterwards.

Figure 4:
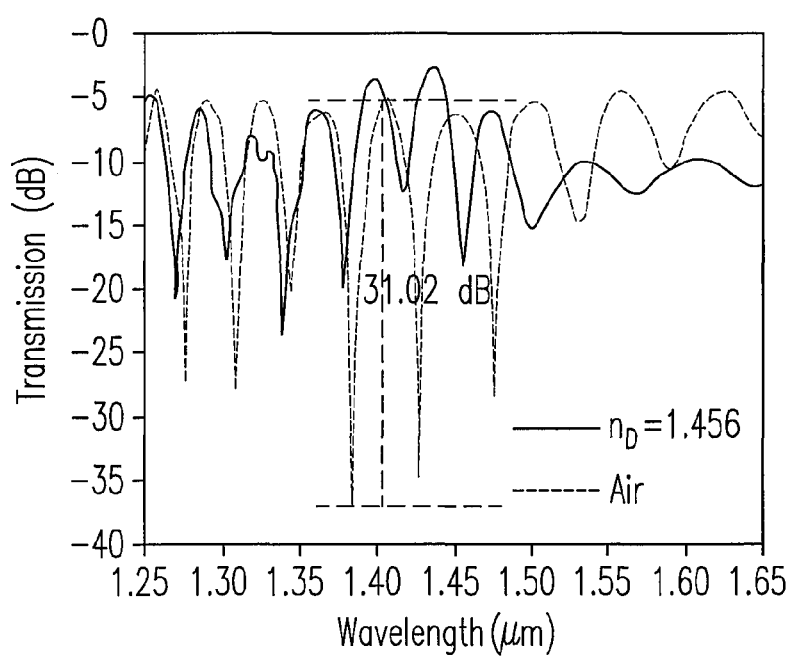
FIG. 4 shows the interference effects to lasers of different wavelengths using a specimen in accordance with the specification listed at the first row of Table 1.

Besides, after comparing the experimental data, one can observe from the data listed at the first row of Table 1 that the best extinction effect reaches 31 dB when the distance L between the two necks is larger than 5 millimeter (5.3 mm in particular) and the difference of the outer diameters of the necks is less than 10%. FIG. 4 shows the interference effects to lasers of different wavelengths using a specimen in accordance with the specification listed at the first row of Table 1. The single-fiber MZI apparatus provided by the present invention produces different extinction ratios to laser lights having different wavelengths. Such a character can be widely used as optical filters or laser controller.

According to the abovementioned experiment results, an optical fiber highly doped with erbium-ytterbium and having a high digital aperture (such as NA=0.22) can provide high extinction effect at a short distance. There is one point of view to explain the phenomena: The rare earth dopants existing in the necks are helpful to split the light into the two different paths for different conditions of phase delay. The existence of rare earth dopants increases the refraction index of the doped optical fiber material, which increases the effect of phase delay. Therefore, the difference of phase delay to the lasers in the two paths accumulates as the two lights propagating in the two paths respectively, and reaches a value for a good interference effect afterwards in a relatively short distance.

To produce the mentioned MZI with single-fiber more economically as well as more efficiently, the present invention provides a manufacturing process including the following steps: (a) providing an optical fiber having a jacket and a core containing rare earth element dopants; (b) stripping the jacket of a segment of the optical fiber; and (c) performing a fused-tapering to the stripped segment of the optical fiber to form a first and a second necks simultaneously, wherein the core exists in both the first and the second necks to form a Mach-Zehnder interferometer. Preferably, the step (c) is performed by placing the stripped segment of the optical fiber across a flame to fuse and taper the striped segment of the optical fiber by a high temperature at brims of the flame. Options for the flame includes a hydrogen-oxygen flame. A laser is also useful for heating the stripped section of the optical fiber to form the two necks. According to preferred embodiments, the optical fiber is doped with at least a rare earth element including one selected from a group consisting of an erbium, a ytterbium, a samarium, a praseodymium and a thulium, and the core comprises a base material including one selected from a group consisting of a phosphosilicate, a phosphate, a tellurite and a silicate. To control the distance L between the two necks, one may choose to control the external diameter of the flame, or the distance between two laser beams for heating the optical fiber, at the expected distance L. For example, controlling the outer diameter of the flame at 5.3 millimeter to result in a distance L between the two necks at around 5.3 millimeter.

Figure 5:
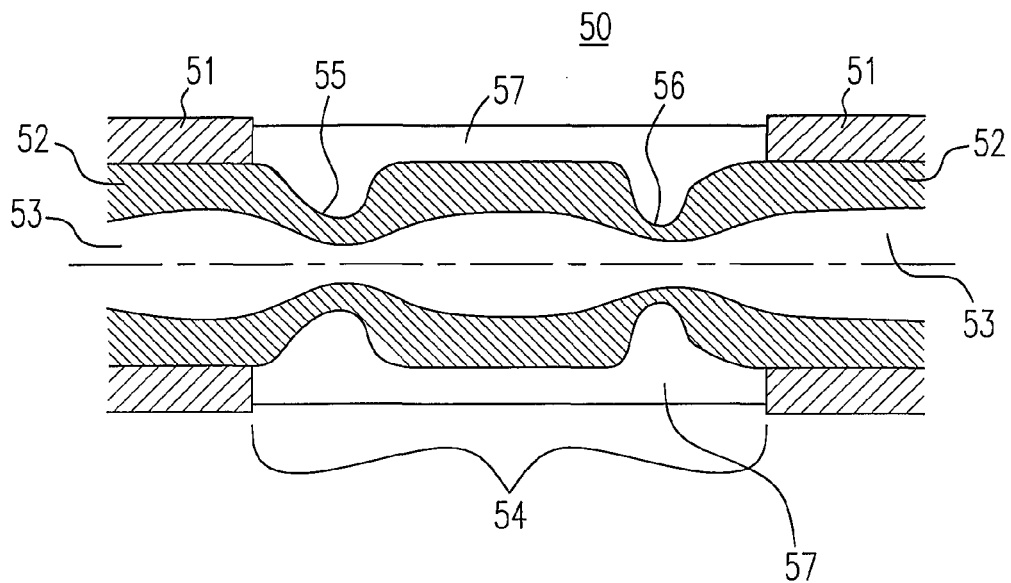
FIG. 5 shows an MZI according to the second embodiment of the present invention.
Figure 6:
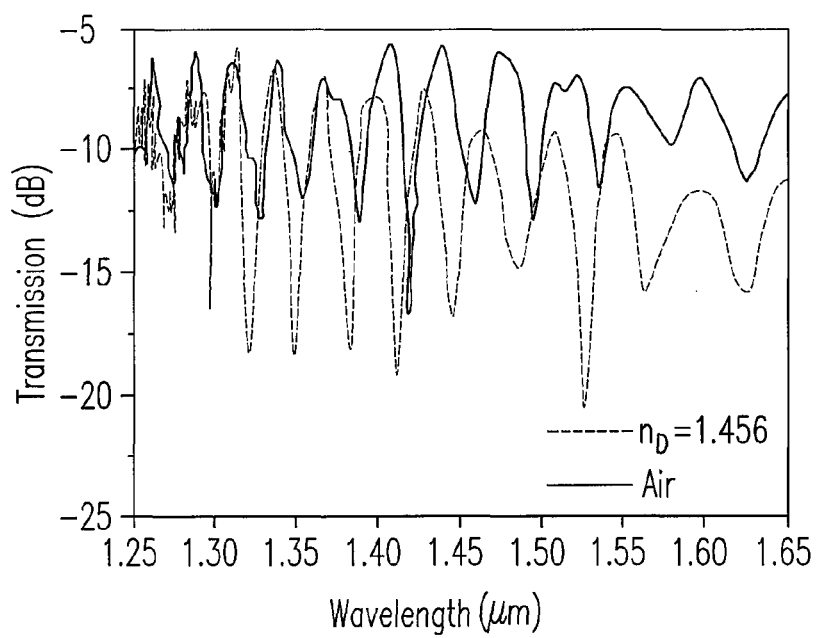
FIG. 6 shows the interference effects to lasers of different wavelengths using a specimen in accordance with the specification listed at the second row of Table 1 and immersed in oil with refraction index of 1.456.

Please refer to the data listed at the third row of Table 1. When the difference between the outer diameters of the necks is larger than 10%, D1=39 and D2=65 for example, the extinction ratio of the MZI exposed to the air is reduced significantly. To resolve this issue, the present invention provides a method to compensate the effect. Please refer to FIG. 5, which schematics an MZI 50 having a structure similar to the MZI 20 in FIG. 2. Jackets 51 at both ends encompass a cladding 52 and a core 53. A stripped section 54 has a first and a second necks 55, 56 having a first and a second outer diameters (not shown). According to FIG. 5, a medium 57 having diffraction index higher than that of the air is disposed to encompass the stripped section 54, and allows the cladding 52 directly contact the medium 57. One preferred embodiment of the medium 57 is a fluid having diffraction index around 1.5, such as oil. FIG. 6 shows the interference effects to lasers of different wavelengths using a specimen in accordance with the specification listed at the second row of Table 1 and immersed in oil with refraction index of 1.456. It can be observed that the interference effect thereof has been increased significantly, compared with that of the specimen disposed in the air, when the size difference between the two necks are larger than 10% but less than 20%. However, referring to the data at the third row of Table 1, if the difference is too large, such as 50%, the effect of interference is limited no matter what kind of medium is disposed outside the stripped section.

Figure 7:
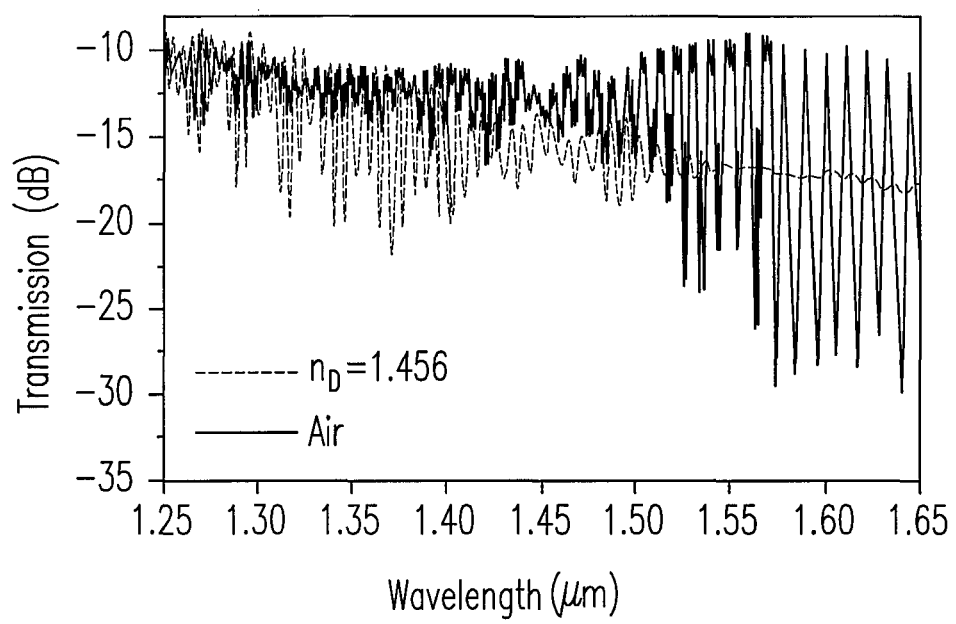
FIG. 7 shows the interference effects to lasers of different wavelengths using a specimen in accordance with the specification listed at the fifth row of Table 1.

The distance L between the two necks of the MZI apparatus according to the present invention has a significant influence to the function of the MZI. When the distance L is increased, the overall length of the optical fiber to be used has to be increased. Referring to the data at the last two lows of Table 1, the best extinction ratios in the air of the two single-fiber MZI having distances L near 30 millimeter are around 20%. Please refer to FIG. 7, which shows the interference effects to lasers of different wavelengths using a specimen in accordance with the specification listed at the fifth row of Table 1. Since the dimensional difference between the necks are less than 10%, the use of medium 57 is of no particular effect. Comparing the illustrations of FIG. 4 and FIG. 7, one can realize that when D1=49.7 micrometer and D2=53.5 micrometer, the interference effects to the light having longer wavelengths are more obvious, and the differences in terms of the effect for the lights with different wavelengths, which is good for being a filter. When D1=46 micrometer and D2=49 micrometer, the interference effects to the light having shorter wavelengths are more obvious.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims that are to be accorded with the broadest interpretation so as to encompass all such modifications and similar structures.

What is claimed is:

1. A method for producing a Mach-Zehnder filtering device, comprising steps of:
   (a) providing an optical fiber having a jacket and a core containing rare earth element dopants, wherein the optical fiber further includes a cladding encompassing the core;
   (b) stripping the jacket of a segment of the optical fiber, wherein the cladding in the stripped portion of the jacket is further etched, and a thin layer of the cladding remains to encompass the core; and
   (c) performing a fused-tapering to the stripped segment of the optical fiber to form a first and a second necks simultaneously, wherein the core exists in both the first and the second necks to form a Mach-Zehnder interferometer.

2. A method as claimed in claim 1, wherein the first neck transfers a portion of a core-mode energy of a light proceeding in the core into an energy of cladding modes thereof, and the second neck transfers the energy of the cladding modes of the light back into the core-mode energy thereof to from an interference.

3. A method as claimed in claim 1, wherein the step (c) is performed by placing the stripped segment of the optical fiber across a flame to fuse and taper the striped segment of the optical fiber by a high temperature at brims of the flame.

4. A method as claimed in claim 1, wherein the fused-tapering is performed by heating the stripped section of the optical fiber by a laser.

5. A method as claimed in claim 1, wherein the optical fiber is doped with at least a rare earth element including one selected from a group consisting of an erbium, a ytterbium, a samarium, a praseodymium and a thulium.

6. A method as claimed in claim 1, wherein the core comprises a base material including one selected from a group consisting of a phosphosilicate, a phosphate, a tellurite and a silicate.

7. A method as claimed in claim 1, wherein each of the optical fiber and the first and the second necks thereof has a polarization-maintaining structure.

8. A wavelength-adjustable Mach-Zehnder filtering device, comprising:
   an optical fiber doped with a rare-earth element having a core, a first and a second necks, and the core exists in the first and the second necks, wherein the core of the optical fiber has a variety of conditions of a photon population inversion pumped by an external pumping light.

9. An apparatus as claimed in claim 8, wherein the first neck transfers a portion of a core-mode energy of a light proceeding in the core into an energy of cladding modes thereof, and the second neck transfers the energy of the cladding modes of the light back into core-mode energy thereof to form an interference.

10. An apparatus as claimed in claim 8, wherein the stripped section of the optical fiber is placed across a flame, and a fused-tapering process is performed by a high temperature at brims of the flame.

11. An apparatus as claimed in claim 8, wherein the stripped section of the optical fiber is heated by a laser during a fused-tapering process.

12. An apparatus as claimed in claim 8, wherein the optical fiber is further doped with at least an element being one selected from a group consisting of an erbium, a ytterbium, a samarium, a praseodymium and a thulium.

13. An apparatus as claimed in claim 8, wherein the core comprises a basic material including one selected from a group consisting of a phosphosilicate, a phosphate, a tellurite and a silicate.

14. An apparatus as claimed in claim 8, wherein each of the optical fiber and the first and the second necks thereof has a polarization-maintaining structure.

15. An apparatus as claimed in claim 8, wherein the external pumping light has a wavelength at a strong-absorption and strong-emission wavelength region of the optical fiber.

16. An apparatus as claimed in claim 8, wherein the external pumping light changes the conditions of the photon population inversion to change a refractive index of the core.

* * * * *